(12) United States Patent
Ohta et al.

(10) Patent No.: US 11,814,511 B2
(45) Date of Patent: Nov. 14, 2023

(54) HYDROGEL COMPOSITION, TISSUE MODEL, AND MANUFACTURING METHOD FOR TISSUE MODEL

(71) Applicant: TOHOKU UNIVERSITY, Sendai (JP)

(72) Inventors: Makoto Ohta, Sendai (JP); Yasutomo Shimizu, Sendai (JP); Ren Takahashi, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 672 days.

(21) Appl. No.: 16/640,881

(22) PCT Filed: Aug. 21, 2018

(86) PCT No.: PCT/JP2018/030844
§ 371 (c)(1),
(2) Date: Feb. 21, 2020

(87) PCT Pub. No.: WO2019/039473
PCT Pub. Date: Feb. 28, 2019

(65) Prior Publication Data
US 2020/0354557 A1 Nov. 12, 2020

(30) Foreign Application Priority Data

Aug. 21, 2017 (JP) ................. 2017-158316

(51) Int. Cl.
*G09B 23/30* (2006.01)
*C08L 29/04* (2006.01)

(52) U.S. Cl.
CPC .............. *C08L 29/04* (2013.01); *G09B 23/30* (2013.01)

(58) Field of Classification Search
CPC ................. G09B 23/28; G09B 23/30
(Continued)

(56) References Cited

U.S. PATENT DOCUMENTS 4,762,495 A * 8/1988 Maloney ............ G09B 23/30
623/5.11
8,480,407 B2 * 7/2013 Campbell ............ G09B 23/28
434/272
(Continued)

FOREIGN PATENT DOCUMENTS

CN 202332046 U 7/2012
JP 2007316434 A 12/2007
(Continued)

OTHER PUBLICATIONS

Office Action dated Jan. 26, 2022, in corresponding Chinese Patent Application No. 201880063535.X and English translation of the Office Action. (12 pages).
(Continued)

*Primary Examiner* — Kurt Fernstrom
(74) *Attorney, Agent, or Firm* — BUCHANAN INGERSOLL & ROONEY PC

(57) ABSTRACT

A hydrogel composition, a tissue model, and a method of manufacturing the tissue model by which time and cost for manufacturing the tissue model can be reduced while the viscosity of the tissue model can be suitably maintained is provided. A hydrogel composition is used for a tissue model and comprises a polyvinyl alcohol and a pseudoplastic compound. A tissue model comprises the hydrogel composition. A manufacturing method for a tissue model comprises a step of preparing a solution including a polyvinyl alcohol and a pseudoplastic compound, and a step of discharging the solution into a mold of the tissue model at a shear rate of 0.01 to 300 $sec^{-1}$.

13 Claims, 4 Drawing Sheets

(58) Field of Classification Search
USPC .................................. 434/262, 267, 272
See application file for complete search history.

(56) References Cited

U.S. PATENT DOCUMENTS

| | | | | |
|---|---|---|---|---|
| 8,702,431 | B2* | 4/2014 | Ikeno | G09B 23/303 |
| | | | | 434/267 |
| 8,801,438 | B2* | 8/2014 | Sakezles | G09B 23/30 |
| | | | | 434/274 |
| 10,081,727 | B2* | 9/2018 | Felsinger | C08J 5/122 |
| 10,847,057 | B2* | 11/2020 | Felsinger | G09B 23/30 |
| 10,950,143 | B2* | 3/2021 | Niimi | B33Y 80/00 |
| 2005/0037082 | A1* | 2/2005 | Wan | A61L 31/10 |
| | | | | 435/252.1 |
| 2006/0184005 | A1* | 8/2006 | Sakezles | G09B 23/28 |
| | | | | 600/416 |
| 2008/0076101 | A1* | 3/2008 | Hyde | G09B 23/30 |
| | | | | 156/61 |
| 2009/0214623 | A1* | 8/2009 | Wan | F16L 9/00 |
| | | | | 514/56 |
| 2010/0311025 | A1* | 12/2010 | Everett | C08L 89/04 |
| | | | | 106/156.51 |
| 2012/0282584 | A1* | 11/2012 | Millon | B29C 39/003 |
| | | | | 264/28 |
| 2012/0288839 | A1* | 11/2012 | Crabtree | B65D 75/5883 |
| | | | | 434/267 |
| 2018/0357930 | A1* | 12/2018 | Kuwabara | A61L 27/52 |

FOREIGN PATENT DOCUMENTS

| | | | | |
|---|---|---|---|---|
| JP | 2015-069073 | * | 4/2015 | ............ G09B 23/28 |
| JP | 2015069073 | A | 4/2015 | |
| JP | 2016-157121 | A | 9/2016 | |
| WO | 2017099023 | A1 | 6/2017 | |

OTHER PUBLICATIONS

Kosukegawa et al., "Measurements of Dynamic Viscoelasticity of Poly (vinyl alcohol) Hydrogel for the Development of Blood Vessel Biomodeling", Journal of Fluid Science and Technology, (Jan. 24, 2008), vol. 3, No. 4, pp. 533-543.

International Search Report (with English Translation) and Written Opinion issued in corresponding International Patent Application No. PCT/JP2018/030844, 5 pages (dated Nov. 13, 2018.

Office Action dated Jul. 5, 2021, in corresponding Chinese Patent Application No. 201880063535.X and English translation of the Office Action. (20 pages).

Office Action (Notice of Reasons for Refusal) dated Jun. 14, 2022, in corresponding Japanese Patent Application No. 2019-537639 and English translation of the Office Action. (11 pages).

Office Action dated May 7, 2022, in corresponding Chinese Patent Application No. 201880063535.X and English translation of the Office Action. (13 pages).

* cited by examiner

HYDROGEL COMPOSITION, TISSUE MODEL, AND MANUFACTURING METHOD FOR TISSUE MODEL

TECHNICAL FIELD

The present invention relates to a hydrogel composition which is used as a material for molding a tissue model, to a tissue model which includes the hydrogel composition, and to a manufacturing method for the tissue model.

BACKGROUND ART

PTL 1 discloses a tissue model in which a poly(vinyl alcohol) hydrogel composition is used as a molding material. The tissue model as exemplified in PTL 1 is manufactured by discharging a polyvinyl alcohol solution to a mold of the tissue model using a device such as a dispenser, and gelling an injection-molded or pressure-molded polyvinyl alcohol solution.

CITATION LIST

Patent Literature

PTL 1: JP-A-2007-316434

Non-Patent Literature

Non-PTL 1: Kosukegawa, H., Mamada, K., Kuroki, K., Liu, L., Inoue, K., Hayase, T., and Ohta, M., Measurements of Dynamic Viscoelasticity of Poly(vinyl alcohol) Hydrogel for the Development of Blood Vessel Biomodeling, Journal of Fluid Science and Technology, Vol. 3, No. 4 (2008), pp. 533-543

SUMMARY OF INVENTION

Technical Problem

In the manufacture of the tissue model, a high concentration solution of the polyvinyl alcohol may be used to make the viscosity and elasticity of the hydrogel composition similar to the viscosity and elasticity of the actual tissue. The viscosity of the polyvinyl alcohol solution increases as the concentration of the polyvinyl alcohol solution increases. Therefore, when the high concentration solution of polyvinyl alcohol is used to manufacture the tissue model, a large amount of energies are needed to discharge the polyvinyl alcohol solution.

Further, if the concentration and viscosity of polyvinyl alcohol solution increase, the possibility of clogging of the nozzles or needles of the dispenser increases. If the nozzles or needles is clogged, an amount of the polyvinyl alcohol solution which is discharged from the dispenser cannot be kept constant. Thus, when the high concentration of the polyvinyl alcohol solution is used to manufacture the tissue model, the maintenance times and costs for keeping constant the amount of the polyvinyl alcohol solution which is discharged from the dispenser are increased.

Therefore, when the tissue model is manufactured by using the high concentration solution of the polyvinyl alcohol, there is a problem that time and cost for manufacturing the tissue model may be increased.

The present invention has been made in order to solve the above-described problems, and an object thereof is to provide a hydrogel composition, a tissue model, and a method of manufacturing the tissue model by which time and cost for manufacturing the tissue model can be reduced while the viscosity of the tissue model can be suitably maintained.

Solution to Problem

A hydrogel composition according to the present invention is used for a tissue model and comprises a polyvinyl alcohol and a pseudoplastic compound.

Also, a tissue model according to the present invention comprises above-mentioned hydrogel composition.

Further, a manufacturing method for a tissue model according to the present invention comprises a step of preparing a solution including a polyvinyl alcohol and a pseudoplastic compound, and a step of discharging the solution into a mold of the tissue model at a shear rate of 0.01 to 300 $sec^{-1}$.

Advantageous Effects of Invention

According to the present invention, it is possible to provide a hydrogel composition, a tissue model, and a method of manufacturing the tissue model by which time and cost for manufacturing the tissue model can be reduced while the viscosity of the tissue model can be suitably maintained, by using the polyvinyl alcohol and the pseudoplastic compound.

DESCRIPTION OF EMBODIMENTS

[Polyvinyl Alcohol]

A polyvinyl alcohol 1 constituting a hydrogel composition of the present invention will be described.
(Chemical Structure of Polyvinyl Alcohol)

Figure 1:
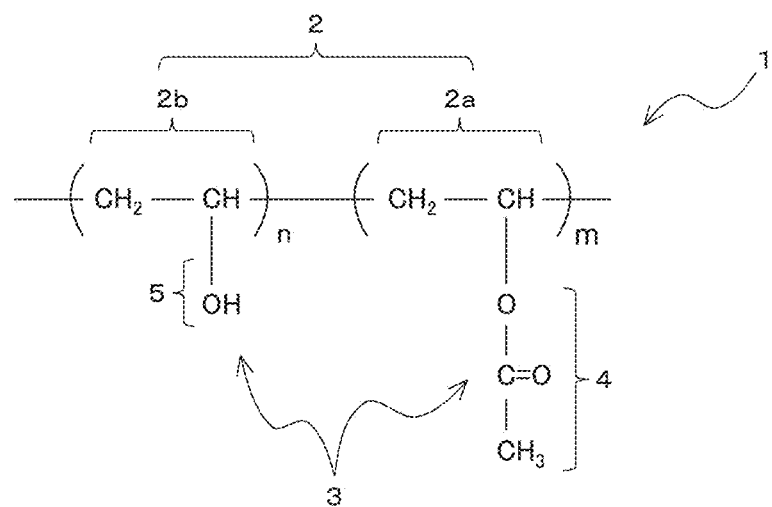
FIG. 1 is a chemical formula representing a structure of polyvinyl alcohol constituting a hydrogel composition of the present invention.

FIG. 1 is a chemical formula representing the structure of the polyvinyl alcohol 1 constituting the hydrogel composition of the present invention. Incidentally, m and n in the chemical formula of FIG. 1 represent variables indicating an integer of 1 or more.

As illustrated in FIG. 1, the polyvinyl alcohol 1 is a synthetic resin of a polymer compound composed of a linear basic skeleton 2 and functional groups 3. The basic skeleton 2 of the polyvinyl alcohol 1 is composed of m first hydrocarbon skeleton parts 2a represented by chemical formula —CH$_2$—CH— and n second hydrocarbon skeleton parts 2b represented by the same chemical formula —CH$_2$—CH— as that of the first hydrocarbon skeleton part 2a. In the polyvinyl alcohol 1, the first hydrocarbon skeleton part 2a and the second hydrocarbon skeleton part 2b are linearly and randomly bonded to each other by a covalent bond between carbon atoms. The functional group 3 has m hydrophobic acetate groups 4 (—COOCH$_3$), one of which is linked to one first hydrocarbon skeleton part 2a, and n hydrophilic hydroxyl groups 5 (—OH), one of which is linked to one second hydrocarbon skeleton part 2b.

(Method for Producing Polyvinyl Alcohol)

The polyvinyl alcohol 1 as an industrial product is produced by a process including a synthesis step, a polymerization step, and a saponification step. The synthesis step includes a step of purifying a vinyl acetate monomer from ethylene and acetic acid. The polymerization step includes a step of producing a polyvinyl acetate as a polymer from the vinyl acetate monomer. The saponification step includes a step of replacing acetate groups 4 of the polyvinyl acetate with hydroxyl groups 5. The precipitate of the polyvinyl alcohol 1 produced by the above-mentioned process is separated from the methanol solvent is separated from water and then purified to thereby produce crystalline polyvinyl alcohol 1. The crystalline polyvinyl alcohol 1 is dried to remove moisture, thereby obtaining a dried product of the polyvinyl alcohol 1. The dried product of the polyvinyl alcohol 1 is subjected to pulverization processing as necessary, and is used as a granular or powdery industrial product.

(Industrial Use of Polyvinyl Alcohol)

The polyvinyl alcohol 1 is used as a molding material for manufacturing a tissue model, and is also used as a raw material for a biocompatible material such as artificial joint, a cosmetic raw material, and a pharmaceutical additive.

In addition to the above-described use application, the polyvinyl alcohol 1 can be used in various use applications. For example, the polyvinyl alcohol 1 is also used as a raw material of vinylon that is a synthetic fiber, a raw material of a polarizer film that is an optical film for a flat panel display, and a raw material of an acetal resin. Other than, the polyvinyl alcohol 1 is also used as a fiber processing agent, a coating agent for paper processing, a binder for paper processing, an adhesive, a liquid glue, slime used in toys or science educational materials, a polymerization stabilizer of vinyl chloride, a binder of an inorganic substance, and the like.

[Hydrogel Composition]

Next, a chemical structure of the hydrogel composition 10 of the present invention will be described using FIG. 2.

(Chemical Structure of Hydrogel Composition)

Figure 2:
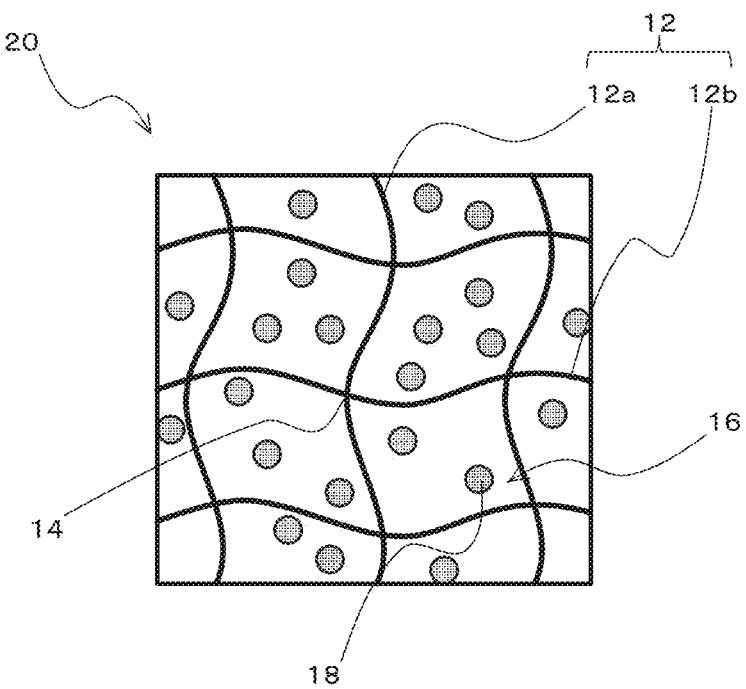
FIG. 2 is a schematic view illustrating a chemical structure of the hydrogel composition of the present invention.

FIG. 2 is a schematic view illustrating a chemical structure of the hydrogel composition 10 of the present invention. Incidentally, the hydrogel composition 10 of the present invention contains a resin of polyvinyl alcohol 1 and is also referred to as a polyvinyl alcohol hydrogel. Further, the polyvinyl alcohol hydrogel is also abbreviated as PVA-H.

The gel composition refers to a composition in which, in specific atoms or atom groups contained in chain-like polymer compounds, the polymer compounds are partially bonded to form a three-dimensional network structure and which contains a low-molecular-weight solvent, which is confined to lose fluidity, inside the three-dimensional network structure. In the present invention, the gel composition containing water inside the network structure as a solvent or the gel composition containing a mixed solvent of water and an organic solvent which is miscible in water inside the network structure as a solvent is referred to as the "hydrogel composition."

As illustrated in FIG. 2, the network structure of the hydrogel composition 10 has polymer chains 12, which are carbon chain moieties having carbon atoms linearly bonded in the polymer compound, and a crosslink region 14 that is a bonding region between first and second polymer chains 12a and 12b. Incidentally, although not illustrated in FIG. 2, the second polymer chain 12b is adjacent to the first polymer chain 12a at a skew position and is sterically bonded in the crosslink region 14. In other words, the three-dimensional network structure of the hydrogel composition 10 is configured by the crosslink region 14 bonding the first polymer chain 12a and the second polymer chain 12b.

(Solvent of Hydrogel Composition)

Further, as illustrated in FIG. 2, the hydrogel composition 10 contains a low-molecular-weight solvent 18 which is confined in a network portion 16 of the three-dimensional network structure configured by the polymer chain 12 and the crosslink region 14 to lose fluidity. Although not illustrated in the drawing, since the molecule of the solvent 18 receives a strong attracting force, caused by an intermolecular force, from the polymer chain 12, the degree of freedom of the molecule of the solvent 18 becomes lowest in the vicinity of the three-dimensional network structure. That is, a constraint force of the molecule of the solvent 18 becomes largest in the vicinity of the three-dimensional network structure. Further, as the molecule of the solvent 18 is separated away from the three-dimensional network structure, the degree of freedom of the molecule of the solvent 18 is increased and the constraint force of the molecule of the solvent 18 is decreased.

In the hydrogel composition 10 of the present invention, the low-molecular-weight solvent 18 is not limited, but for example, a mixed solvent of water and an organic solvent which is miscible in water, water, or saline can be used.

As water which is preferable used for the solvent 18 of the present invention, for example, pure water such as ion-exchange water, ultrafiltration water, reverse osmosis water, or distilled water, ultrapure water, and the like are mentioned, but the water is not limited thereto.

Further, as the organic solvent which is miscible in water, although not limited, for example, it is possible to use alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketone alcohols such as acetone, methyl ethyl ketone, and diacetone alcohol; ethers such as tetrahydrofuran and dioxane; polyhydric alcohols such as ethylene glycol, propylene glycol, 1,2-propanediol, 1,2-butanediol, 1,3-butanediol, 1,4-butanediol, diethylene glycol, triethylene glycol, 1,2,6-hexanetriol, thioglycol, hexylene glycol, and glycerin; polyalkylene glycols such as polyethylene glycol and polypropylene glycol; lower alcohol ethers of polyhydric alcohol such as ethylene glycol monomethyl ether, ethylene glycol monoethyl ether, diethylene glycol methyl ether, diethylene glycol ethyl ether, triethylene glycol monomethyl ether, and triethylene glycol monoethyl ether; alkanolamines such as monoethanolamine, diethanolamine, and triethanolamine; N-methyl-2-pyrolidone; 2-pyrolidone; 1,3-dimethyl-2-imidazolidinone; dimethyl sulfoxide; and the like. The above-described organic solvent can be selected depending on purposes such as providing of moisture-retaining property, providing of antibacterial property, providing of antifungal property, providing of conductive property, and adjusting of viscosity or elasticity. Further, as the above-described organic solvent, any one kind of organic solvents may be used singly or two or more kinds of organic solvents may be used.

As an organic solvent which is preferably used in the present invention, for example, there is mentioned acetone, dimethylformamide, glycerin, dimethyl sulfoxide, or the like. An organic solvent which is most preferably used in the present invention is dimethyl sulfoxide which is capable of providing proper elasticity to the hydrogel composition 10. Further, the dimethylformamide is also abbreviated as DMF.

The hydrogel composition 10 is produced by gelling a solution which is prepared by dissolving the polyvinyl alcohol in a low molecular weight solvent 18. The specific producing method for the hydrogel composition 10 will be described hereinafter.

(Crosslink Region of Hydrogel Composition)

In the present invention, the crosslink region 14 of the hydrogel composition 10 can be configured to have only a physically crosslinked structure by a hydrogen bond of the hydroxyl group 5 and not to have a chemically crosslinked structure which is obtained by crosslinking polymer compounds by a covalent bond.

Figure 3:
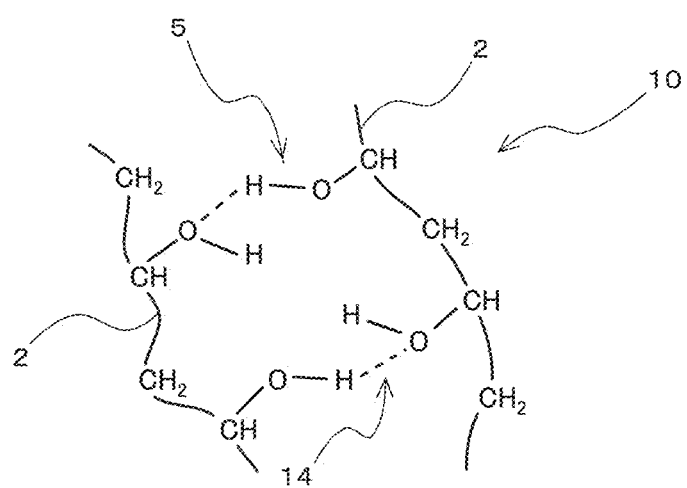
FIG. 3 is a schematic view illustrating a part of a crosslink region by a hydrogen bond of the hydrogel composition of the present invention.

FIG. 3 is a schematic view illustrating a part of the crosslink region 14 by a hydrogen bond of the hydrogel composition 10 of the present invention. The basic skeleton 2 that is a linear alkyl chain of the polyvinyl alcohol 1 in FIG. 3 corresponds to the polymer chain 12 in the hydrogel composition 10 of FIG. 2. Further, as illustrated in FIG. 3, in the present invention, the crosslink region 14 of the hydrogel composition 10 is physically crosslinked by a hydrogen bond of the hydroxyl group 5 that is the functional group 3 of the polyvinyl alcohol 1.

That is, in the hydrogel composition 10, the resin of the polyvinyl alcohol 1 has a three-dimensional network structure. In addition, the hydrogel composition 10 has the low-molecular-weight solvent 18, which is confined to lose fluidity, inside the three-dimensional network structure of the resin of the polyvinyl alcohol 1.

(Physical Properties of Hydrogel Composition)

The hydrogel composition 10 provides various physical properties depending on a difference in the degree of polymerization and the degree of saponification of the polyvinyl alcohol 1, the content of the polyvinyl alcohol 1 contained in the hydrogel composition 10, and the like. Therefore, by using the hydrogel composition 10, various tissue models can be manufactured. Herein, the degree of polymerization and the degree of saponification of the polyvinyl alcohol 1 and the content of the polyvinyl alcohol 1 in the hydrogel composition 10 which are some of parameters determining physical properties of the hydrogel composition 10 will be described.

(Degree of Polymerization of Polyvinyl Alcohol)

The degree of polymerization of the polyvinyl alcohol 1 corresponds to the length of the basic skeleton 2 of the polyvinyl alcohol 1, and as the degree of polymerization increases, the basic skeleton 2 of the polyvinyl alcohol 1 is lengthened and the molecular weight of the polyvinyl alcohol 1 is increased. The degree of polymerization of the polyvinyl alcohol 1 is determined by the degree of polymerization of polyvinyl acetate in the polymerization process. The degree of polymerization of the polyvinyl alcohol 1 is calculated, for example, by measuring a molecular weight by a liquid chromatography method such as gel permeation chromatography.

Further, the degree of polymerization (DP) of the polyvinyl alcohol 1 is calculated by the following mathematical formula (1) in the case of using a variable m and a variable n illustrated in FIG. 1.

$$DP=m+n \quad (1)$$

As the degree of polymerization of the polyvinyl alcohol 1 increases, physical properties such as viscosity, film strength, and water resistance of the hydrogel composition 10 are increased. In addition, as the degree of polymerization of the polyvinyl alcohol 1 increases, physical properties such as viscosity stability of the hydrogel composition 10 at a low temperature are decreased. Further, as the degree of polymerization of the polyvinyl alcohol 1 increases, the molecular weight and the intermolecular force of the polyvinyl alcohol 1 are increased, and thus the solubility of the polyvinyl alcohol 1 is decreased and the viscosity thereof is increased.

(Degree of Saponification of Polyvinyl Alcohol)

The degree of saponification of the polyvinyl alcohol 1 corresponds to a ratio (RH) of the hydroxyl group 5 in the functional group 3 of the polyvinyl alcohol 1, and as the degree of saponification increases, the amount of the hydroxyl group 5 of the polyvinyl alcohol 1 is increased. The degree of saponification of the polyvinyl alcohol 1 is determined by the amount of hydroxyl groups 5 in the polyvinyl alcohol 1 substituted for acetate groups 4 in the saponification process. The degree of saponification of the polyvinyl alcohol 1 is calculated, for example, by quantitating the amount of the acetate groups 4 of the polyvinyl alcohol 1 by using sodium hydroxide. Specifically, the degree of saponification (DS) is calculated as a numerical value of mol % unit by the following mathematical formula (2) by converting the quantitated amount of the acetate groups 4 into a molar percentage unit, that is, mol % unit as the ratio (RA) of the acetate groups 4 in the functional group 3 of the polyvinyl alcohol 1.

$$DS=RH=1-RA \quad (2)$$

Further, the degree of saponification (DS) of the polyvinyl alcohol 1 is calculated as a numerical value of mol % unit by the following mathematical formula (4) in the case of using the variable m and the variable n illustrated in FIG. 1.

$$DS=\{n/(m+n)\}\times 100 \quad (3)$$

As the degree of saponification of the polyvinyl alcohol 1 increases, physical properties such as viscosity, film strength, and water resistance of the hydrogel composition 10 are increased. In addition, as the degree of saponification of the polyvinyl alcohol 1 increases, physical properties such as viscosity stability of the hydrogel composition 10 in a low temperature are decreased. Further, as the degree of saponification of the polyvinyl alcohol 1 increases, the polyvinyl alcohol 1 is easily crystallized, and thus the solubility of the polyvinyl alcohol 1 is decreased and the viscosity thereof is increased.

(Content of Polyvinyl Alcohol in Hydrogel Composition)

The content of the polyvinyl alcohol 1 in the hydrogel composition 10 is calculated in wt % unit as the ratio of the weight of the polyvinyl alcohol 1 to the weight of the hydrogel composition 10. As the content of increase, the polyvinyl alcohol 1 is easily crystallized. Consequently, the solubility of the hydrogel composition 10 is decreased and the elasticity of the hydrogel composition 10 is increased.

(Regulation of Physical Properties of Hydrogel Compound by Pseudoplastic Compound)

In the present invention, a pseudoplastic compound, that is, a compound having pseudoplasticity is used as a thickener that improves the solubility of the polyvinyl alcohol 1 by reducing the content of the polyvinyl alcohol 1 and maintains the viscosity of the hydrogel composition 10. The pseudoplasticity refers to the property that the viscosity of a fluid decreases when pressure or the like is applied to the fluid. The pseudoplastic compounds is selected, for example, from the group consisting of xanthan gum, ultra-xanthan gum, guar gum, welan gum, diutan gum, tamarind seed gum, locust bean gum, rhamzan gum, carrageenan, pullulan, curdlan, hydroxyethylcellulose, hydroxypropylethylcellulose, methylcellulose, acrylics, and salts and derivatives thereof, and combinations thereof.

Xanthan gum is a representative example of a pseudoplastic compound and is a polysaccharide produced by fermenting a starch such as corn starch. The viscosity of xanthan gum is generated by mixing xanthan gum with water. Xanthan gum is used as a thickener or a thickener stabilizer in cosmetics, food additives, and the like. In the present invention, by adding xanthan gum to the hydrogel composition 10, the content of polyvinyl alcohol 1 can be reduced and the solubility of polyvinyl alcohol 1 can be improved. In addition, a decrease in viscosity of the hydrogel composition 10 due to a decrease in the content of the polyvinyl alcohol 1 can be improved.

[Tissue Model]

Next, the tissue model using the hydrogel composition 10 of the present invention will be described. The tissue model of the present invention can be manufactured as a soft tissue model that particularly has physical properties such as viscosity, elasticity, and water retention property similar to physical properties of an actual body soft tissue by using the hydrogel composition 10.

Incidentally, in the following description, "the soft tissue" means a tissue excluding a hard tissue such as bone, tooth, or cartilage unless specified otherwise. The soft tissue is not limited, but for example, includes a vascularized tissue, an oral soft tissue such as oral mucosa, a nasal soft tissue such as nasal mucosa, an aural soft tissue such as aural mucosa, a visceral tissue of brain, heart, liver, pancreas, spleen, kidney, bladder, lung, stomach, small intestine, large intestine, uterus, esophagus, or the like, a dermal tissue, a muscle tissue, an eyeball tissue, and the like. In addition, "the body hard tissue" means a hard tissue such as bone, tooth, or cartilage.

(Degree of Polymerization of Polyvinyl Alcohol in Soft Tissue Model)

In the case of manufacturing a soft tissue model, polyvinyl alcohol 1 having a degree of polymerization of 1000 to 2000 is used. In a case where the degree of polymerization of the polyvinyl alcohol 1 is less than 1000, the elasticity of the soft tissue model is decreased more than the elasticity of an actual soft tissue by a decrease in film strength of the hydrogel composition 10. Also, in a case where the degree of polymerization of the polyvinyl alcohol 1 is more than 2000, the viscosity of the soft tissue model is increased more than the viscosity of an actual soft tissue by an increase in viscosity of the hydrogel composition 10. Further, the stationary surface friction coefficient of the soft tissue model is increased more than the stationary surface friction coefficient of an actual soft tissue by an increase in viscosity of the hydrogel composition 10. Therefore, in a case where the degree of polymerization of the polyvinyl alcohol 1 is less than 1000 or more than 2000, sensuality such as tactile sensation of the soft tissue model is decreased.

(Degree of Saponification of Polyvinyl Alcohol in Soft Tissue Model)

Also, in the case of manufacturing a soft tissue model as the tissue model of the present invention, polyvinyl alcohol 1 having a degree of saponification of 85 mol % or more is used. In a case where the degree of saponification of the polyvinyl alcohol 1 is less than 85 mol %, the elasticity of the soft tissue model is decreased more than the elasticity of an actual body soft tissue by a decrease in film strength of the resin of the polyvinyl alcohol 1.

As the degree of saponification of the polyvinyl alcohol 1 approaches 100 mol %, improve the solubility of the polyvinyl alcohol 1 to the solvents 18 is improved. On the other hand, in a case where the degree of polymerization of the polyvinyl alcohol 1 is more than 98 mol %, the viscosity of the soft tissue model may be increased more than the viscosity of an actual soft tissue by an increase in viscosity of the resin of the polyvinyl alcohol 1. Also, the stationary surface friction coefficient of the soft tissue model may be increased more than the stationary surface friction coefficient of an actual soft tissue by an increase in viscosity of the hydrogel composition 10. Therefore, in a case where the polyvinyl alcohol 1 having the degree of saponification more than 98 mol % is used, the content of polyvinyl alcohol 1 needs to be reduced so that the viscosity of the hydrogel composition 10 does not increase.

Also, in the case of manufacturing a soft tissue model, a polyvinyl alcohol resin can be produced by using only one kind of the polyvinyl alcohol 1 having a degree of saponification of 85 mol % or more and a degree of polymerization of 1000 to 2000. In addition, a polyvinyl alcohol resin having an average value of a degree of saponification of 85 mol % or more and an average value of a degree of polymerization of 1000 to 2000 can also be produced by using two or more kinds of the polyvinyl alcohol 1 having a different degree of saponification or degree of polymerization. Incidentally, in the present application, the term "average degree of saponification" corresponds to both "the degree of saponification" in the case of using only one kind of the polyvinyl alcohol 1 and "the average value of the degree of saponification" in the case of using two or more kinds of the polyvinyl alcohol 1. Further, in the present application, the term "average degree of polymerization" corresponds to both "the degree of polymerization" in the case of using only one kind of the polyvinyl alcohol 1 and "the average value of the degree of polymerization" in the case of using two or more kinds of the polyvinyl alcohol 1.

The polyvinyl alcohol 1 can be produced by the method described above. Also, as the polyvinyl alcohol 1, commercially available industrial products can be used. The polyvinyl alcohol 1 having a degree of saponification of 97 mol % or more and a degree of polymerization of 500 to 3000 is commercially available as a completely saponified industrial product. For example, the polyvinyl alcohol 1 is commercially available as industrial products such as JF-05, JF-10, JF-17, JF-20, V, VO, and VC-10 (trade names) from JAPAN VAM & POVAL CO., LTD. Further, the polyvinyl alcohol 1 is, for example, commercially available as industrial products such as PVA-105, PVA-110, PVA-117, PVA-117H, PVA-120, and PVA-124 (trade names) from Kuraray Co., Ltd. Among the above-described examples, the polyvinyl alcohol 1 having a degree of saponification of 99 mol % or more and a degree of polymerization having 500 to 2000 corresponds to industrial products such as JF-17, JF-20, V, VO, and VC-10 of JAPAN VAM & POVAL CO., LTD. and PVA-117H of Kuraray Co., Ltd. (trade names).

Further, in the case of providing the hydrogel composition 10 of the present invention by using two kinds of the polyvinyl alcohol 1, the polyvinyl alcohol having a degree of saponification of 70 to 90 mol % or more and a degree of polymerization of 500 to 3000 may be used by mixing with the completely saponified polyvinyl alcohol.

The polyvinyl alcohol 1 having a degree of saponification of 70 to 90 mol % or more and a degree of polymerization of 500 to 3000 can be produced by the method described above. Also, the polyvinyl alcohol 1 having a degree of saponification of 70 to 90 mol % or more and a degree of polymerization of 500 to 3000 is commercially available as a partially saponified industrial product. For example, the partially saponified polyvinyl alcohol 1 is commercially available as industrial products such as JP-05, JP-10, JP-15, JP-20, JP-24, VP-18, and VP-20 (trade names) from JAPAN VAM & POVAL CO., LTD. Further, the partially saponified polyvinyl alcohol is, for example, commercially available as industrial products such as PVA-205, PVA-210, PVA-217, PVA-220, and PVA-224 (trade names) from Kuraray Co., Ltd.

Incidentally, as the polyvinyl alcohol 1, any dried products of powdery or granular dried products can also be used. However, in the case of taking solubility and a degree of purifying of the dried product into consideration, the polyvinyl alcohol 1 is preferably powdery dried products.

(Content of Polyvinyl Alcohol in Soft Tissue Model)

When a soft tissue model such as a blood vessel tissue is manufactured, a solution of polyvinyl alcohol 1 of 5 to 20 weight percent is used. In the hydrogel composition 10, when the content of the polyvinyl alcohol 1 is 20 weight percent or more, the polyvinyl alcohol 1 is easily crystallized, so that the viscosity of the hydrogel composition 10 increases above the upper limit of viscosity of the actually soft tissue. Also, in the hydrogel composition 10, when the content of the polyvinyl alcohol 1 is 20 weight percent or more, the solubility of the polyvinyl alcohol 1 is decreased. On the other hand, in the hydrogel composition 10, when the content of the polyvinyl alcohol 1 is less than 5 weight percent, the solubility of the polyvinyl alcohol 1 is increased but the crystallization of the polyvinyl alcohol 1 is inhibited, so that the viscosity of the hydrogel composition 10 is decreased.

[Other Additives to Hydrogel Composition]
(Gelling Agent)

Incidentally, to the hydrogel composition 10 of the present invention, as necessary, a small amount of a gelling agent can be added as an adjuvant for physical crosslinking by a hydrogen bond. The gelling agent is not limited, but for example, borates such as sodium tetraborate are used. In addition, the amount of the gelling agent added to the hydrogel composition 10 is not limited, but for example, can be set to 5 wt % or less.

(Antiseptic)

Also, to the hydrogel composition 10 of the present invention, as necessary, a small amount of an antiseptic for providing storage stability can be added. The antiseptic is not limited, but for example, dehydroacetate, sorbate, benzoate, pentachlorophenol sodium, 2-pyridinethiol-1-oxide sodium, 2,4-dimethyl-6-acetoxy-m-dioxane, 1,2-benzthiazolin-3-one, or the like is added. The amount of the antiseptic added to the hydrogel composition 10 is not limited, but for example, can be set to 1 wt % or less.

(Colorant such as Dye and Pigment)

Further, to the hydrogel composition 10 of the present invention, as necessary, a small amount of a colorant can be added in order to replicate color of an actual soft tissue. The amount of the colorant added to the hydrogel composition 10 is not limited, but for example, can be set to 1 wt % or less. The colorant is not limited, but for example, a dye such as a black dye, a magenta dye, a cyan dye, and a yellow dye, a pigment such as a red or magenta pigment, a blue or cyan pigment, a green pigment, a yellow pigment, and a black pigment, or the like is used.

(Water-Swellable Layered Clay Mineral)

Further, in the case of manufacturing, for example, a model of an organ such as heart as the tissue model, in order to make physical properties such as elasticity of the model of the organ similar to physical properties of an actual organ, a water-swellable layered clay mineral can be added to the hydrogel composition 10 of the present invention as necessary. The water-swellable layered clay mineral can be dispersed in the solvent 18 and is a clay mineral having a layered structure. The amount of the water-swellable layered clay mineral added to the hydrogel composition 10 is not limited, but for example, can be set to 1 to 5 wt %. As the water-swellable layered clay mineral, although not limited, for example, water swellable smectite such as water swellable Hectorite, water swellable montmorillonite, and water swellable saponite, and water swellable mica such as water swellable synthetic mica can be used. In addition, water swellable smectite and water swellable mica can be formed to be a clay mineral in which sodium ions are contained between clay mineral layers.

When the water-swellable layered clay mineral is added to the hydrogel composition 10, physical properties such as elasticity of the model of the organ, that is, mechanical strength can be made similar to mechanical strength of an actual organ. In other words, when the water-swellable layered clay mineral is added to the hydrogel composition 10, sensuality such as tactile sensation of the model of the organ can be made similar to that of an actual organ. Therefore, when the water-swellable layered clay mineral is added to the hydrogel composition 1, for example, tactile sensation at the time of incision by a surgical scalpel or the like can be made similar to tactile sensation of an actual organ, and thus a model of an organ suitable for surgery practice can be provided.

As described above, according to the use of the hydrogel composition 10, it is possible to provide a tissue model capable of making physical properties such as viscosity or elasticity similar to physical properties of an actual soft tissue. Particularly, in the case of manufacturing a soft tissue model as the tissue model by using the hydrogel composition 10 of the present invention, it is possible to provide a tissue model suitable for detachment of a soft tissue or surgery practice of incision or the like.

[Manufacturing Method for Tissue Model]

Next, an example of a manufacturing method for a tissue model using the hydrogel composition 10 will be described in detail. In the following description, a case where a soft tissue model such as a vascularized tissue and an oral soft tissue is manufactured as a tissue model is considered.

The tissue model can be manufactured by a method including: a step of adding polyvinyl alcohol 1 to solvent 18; a step of preparing a solution of the polyvinyl alcohol 1; a step of discharging the prepared solution of the polyvinyl alcohol 1 into the mold of the tissue model; and a step of gelling the solution of polyvinyl alcohol 1 which is discharged into the mold of the tissue model to form the tissue model.

(Adding of Polyvinyl Alcohol to Solvent)

As polyvinyl alcohol 1 constituting the polyvinyl alcohol resin, for example, powder of the completely saponified polyvinyl alcohol 1 having a degree of saponification of 99 mol % or more and a degree of polymerization having 500 to 2000 can be used. The content of the polyvinyl alcohol 1 added to the solvent 18 can be set to an arbitrary amount in order to obtain preferable physical properties of the hydrogel composition 10. For example, when a vascularized tissue model is manufactured as a soft tissue model, the vascularized tissue model can be manufactured by adding 17 parts by weight of the polyvinyl alcohol 1 to the solvent 18. Also, the polyvinyl alcohol 1 may be configured as a powder mixture of two or more kinds of the polyvinyl alcohol 1.

As the solvent 18 for manufacturing the tissue model, for example, a mixed solvent of water and dimethyl sulfoxide that is a mixed solvent which is excellent in solubility of the polyvinyl alcohol 1 and is not frozen at a low temperature is used. Incidentally, dimethyl sulfoxide is abbreviated as DMSO in the following description.

Also, the weight ratio of DMSO to water in the mixed solvent is not limited, but for example, can be set to 1 to 10. A preferable weight ratio of DMSO to water in production of the hydrogel composition 10 of the present invention is 1 to 5. A most preferable weight ratio of DMSO to water in manufacture of the tissue model is 4.

Thickeners such as xanthan gum and other additives included in the hydrogel composition 10 described above are also added to the solvent 18 prior to the step of preparing a solution of polyvinyl alcohol 1 described below.

(Preparation of Solution of Polyvinyl Alcohol)

The solvent 18 added with the polyvinyl alcohol 1 is heated, the mixture of the polyvinyl alcohol 1 is dissolved in the solvent 18 while being stirred with a stirrer, and thus a solution of polyvinyl alcohol is prepared. The heating temperature of the solvent 18 can be set, for example, to 60 to 120° C. Further, in the case of taking the degree of solubility or the like of the polyvinyl alcohol 1 into consideration, a preferable heating temperature of the solvent 18 is 100 to 120° C. Incidentally, in the case of taking the boiling point or the like of water in the solvent 18 into consideration, a most preferable heating temperature of the solvent 18 is 100° C.

Incidentally, the mixture of the polyvinyl alcohol 1 being dissolved in the solvent 18 may be performed in an opened state or in a sealed state, but taking prevention of mixing of impurities into consideration, is preferably performed in a sealed state.

(Discharge of Solution of Polyvinyl Alcohol into Mold of Tissue Model)

The prepared solution of the polyvinyl alcohol 1 is discharged into the mold of the tissue model. For example, the solution of the polyvinyl alcohol 1 is injected into the mold of the tissue model by discharging the solution under a pressurized condition of 150 to 160 kg/cm$^2$. By setting the pressurized condition at the time of discharge to 150 to 160 kg/cm$^2$, it is possible to reduce air bubbles generated in the solution of the polyvinyl alcohol 1 discharged into the mold of the tissue model. Therefore, setting the pressurized condition at the time of discharge to 150 to 160 kg/cm$^2$, the solution of the polyvinyl alcohol 1 discharged into the mold of the tissue model can be homogenized.

The mold of the tissue model can be manufactured, for example, by cutting work, stereolithography, molding processing using a modeling device such as a 3D printer, or the like. A material for the mold of the tissue model is not particularly limited as long as it is a material with which the hydrogel composition 10 can be produced into a shape of a tissue, but for example, a material such as a silicone resin, quartz glass, a metal, gypsum, wax, or a synthetic resin can be used. For example, in the case of a metal such as brass, stainless steel, nickel titanium, or alumina as the material for the mold of the tissue, thermal conduction at the time of a freezing treatment can be improved and the freezing time can be decreased.

(Gelation of Solution of Polyvinyl Alcohol)

Next, the mold of the tissue model into which the solution of the polyvinyl alcohol 1 has been injected is subjected to a freezing treatment. By the freezing treatment, the solution of the polyvinyl alcohol 1 in the mold of the tissue model is gelled into polyvinyl alcohol hydrogel including a polyvinyl alcohol resin of a three-dimensional network structure having a plurality of polymer chains and cross-linked regions connecting the plurality of polymer chains to each other, and solvent which is confined in a network portion of the three-dimensional network structure to lose fluidity. A freezing temperature for causing the solution of the polyvinyl alcohol 1 to gel can be set, for example, to −20° C. or lower. Further, in the case of taking physical properties such as viscosity and elasticity of the tissue model (the hydrogel composition 10) into consideration, a preferable freezing treatment temperature of the mold of the tissue model is −40 to −20° C. or lower and a most preferable freezing temperature is −30° C. Further, a preferable freezing treatment time for the mold of the tissue model is 24 hours or longer and a most preferable freezing treatment time is 24 hours. Further, the number of times of the freezing treatment of the mold of the tissue model can be plural times, also taking physical properties of the hydrogel composition 10 into consideration. Thereafter, the manufactured tissue model is taken out of the mold.

In the manufacturing method for the tissue model, before the tissue model is taken out of the mold, a water substitution treatment in which dimethyl sulfoxide ethanol contained in the hydrogel composition 10 is replaced by water may be performed. For example, in the water substitution treatment of the hydrogel composition 10, the mold of the tissue model in which the freezing treatment has been completed is immersed in a sufficient amount of ethanol for 120 minutes so that a treatment in which the dimethyl sulfoxide in the hydrogel composition 10 is replaced by ethanol is performed. Next, the mold of the tissue model is immersed in a sufficient amount of water for 24 hours so that a treatment in which the ethanol in the hydrogel composition 10 is replaced by water is performed.

Incidentally, the tissue model may be produced by a method other than the above-described method. For example, the tissue model may also be produced by a treatment other than the above-described treatment in which the solution of the polyvinyl alcohol 1 is injected into the mold of the tissue model. The tissue model may also be produced by compressively molding the solution of the polyvinyl alcohol 1 on the mold of the tissue model by using a modeling device such as a 3D printer that is an inkjet type material jetting modeling device. Further, the tissue model can also be produced by applying the solution of the polyvinyl alcohol 1 to the mold of the tissue model.

Further, the mold of the soft tissue model can partially include a body hard tissue model of bone, tooth, cartilage, or the like. The hard tissue model of bone, tooth, cartilage, or the like can be manufactured, for example, from gypsum, wood, paper, a metal, or a synthetic resin such as an acrylic resin.

For example, a model of bone can be manufactured by adding sawdust and polyvinyl alcohol to an acrylic resin. In the model of bone, the hardness of bone can be replicated according to an amount of the acrylic resin used, and the tactile sensation of bone can be replicated according to a particle size of the sawdust. Further, in the model of bone, by adding polyvinyl alcohol, a close contact state between the bone and the body soft tissue inside the living body can be replicated.

Further, the soft tissue model can manufactured as a part of a living body model such as an oral cavity model, a nasal cavity model, an aural cavity model, an eye model, a head model, a chest model, or an abdomen model.

For example, in the case of manufacturing an oral cavity model as the living body model, the oral cavity model can be manufactured by injecting the solution of the polyvinyl alcohol 1 into a mold of an oral cavity model including the above-described bone model, causing the solution of the polyvinyl alcohol 1 to gel, and then taking out the mold other than the hard tissue model. Further, the oral cavity model can also be manufactured by compressively molding the solution of the polyvinyl alcohol 1 on the above-described bone model by using a modeling device such as a 3D printer and causing the solution of the polyvinyl alcohol 1 to gel into the hydrogel composition 10.

In the above-described oral cavity model, a close contact state between the bone model and the oral tissue model such as oral mucosa can be made similar to a close contact state between bone and an oral tissue inside a living body. Further, in the above-described oral cavity model, the soft tissue model can be uniformly detached from the hard tissue model by a surgical cutting instrument such as a surgeon's knife. Therefore, in the above-described oral cavity model, feeling similar to a detachment surgery of oral mucosa inside the living body can be replicated.

EXAMPLES

The present invention will be described in detail by means of the following Examples, but the present invention is not limited to these Examples.

In the following descriptions, the polyvinyl alcohol and the xanthan gum are abbreviated as "PVA" and "XG", respectively. Further, the weight percent concentration is abbreviated as "wt %".

Example 1

(Preparation of Sample of Polyvinyl Alcohol Solution)

As the polyvinyl alcohol, an industrial product manufactured by JAPAN VAM & POVAL CO., LTD., trade name: J-POVAL JF-17 was used. J-POVAL JF-17 is a powder of the polyvinyl alcohol prepared to have a degree of saponification of 99.0 mol % or more and a degree of polymerization of 1700.

In the present Examples, as the representative example of the pseudoplastic compound, the xanthan gum was used. As the xanthan gum, an industrial product manufactured by Wako Pure Chemical Industries, Ltd. was used.

As the mixed solvent of dimethyl sulfoxide and water, an industrial product manufactured by Toray Fine Chemicals Co., Ltd., which is prepared to have a weight ratio of dimethyl sulfoxide to water of 4, was used.

The polyvinyl alcohol and the xanthan gum were added to a mixed solvent of dimethyl sulfoxide and water so that the concentration shown in Table 1 can be obtained, stirred for 2 hours under a temperature condition of 100 degrees C. to dissolve the polyvinyl alcohol and the xanthan gum in the mixed solvent, thereby producing Samples 1 to 9 of the polyvinyl alcohol solution. Incidentally, the indication "N/A" in Table 1 means that the polyvinyl alcohol solution contains no xanthan gum.

TABLE 1

|  | SAMPLE 1 | SAMPLE 2 | SAMPLE 3 | SAMPLE 4 | SAMPLE 5 | SAMPLE 6 | SAMPLE 7 | SAMPLE 8 | SAMPLE 9 |
|---|---|---|---|---|---|---|---|---|---|
| PVA CONCENTRATION(wt %) | 17 |  |  | 15 |  |  |  | 12 |  |
| XG CONCENTRATION(wt %) | N/A | N/A | 0.1 | 0.2 | 0.5 | N/A | 0.1 | 0.2 | 0.5 |

Sample 1 in Table 1 is 17 weight percent of the polyvinyl alcohol solution containing no xanthan gum and one example of the polyvinyl alcohol solution conventionally used to manufacture a soft tissue model such as a vascularized tissue.

Example 2

(Measurement of Dynamic Viscosity of Hydrogel Composition)

The dynamic viscosity of the sample of the polyvinyl alcohol solution prepared by the method described in Example 1 was measured. In measurement of the dynamic viscosity of the sample of the polyvinyl alcohol solution, a rheometer, Model No. RS-CPS, manufactured by Brookfield, Canada was used as the precision rotary viscometer. As a sensor for measuring the viscosity, a measuring spindle, Model No. R25-2/3 was used.

In the rheometer, the shear rate of the sample of the polyvinyl alcohol solution was accelerated from 0.01 to 300 ($sec^{-1}$) in 300 seconds and the shear rate and the dynamic viscosity were measured every 3 seconds. The temperature of the sample of the polyvinyl alcohol solution during the measurement of the dynamic viscosity was maintained at 40 degrees C. The measurement of the shear rate and the dynamic viscosity was repeated three times for every sample of the polyvinyl alcohol solution and the value of the dynamic viscosity to each shear rate was calculated as the average value of the 3 measurements.

Figure 4:
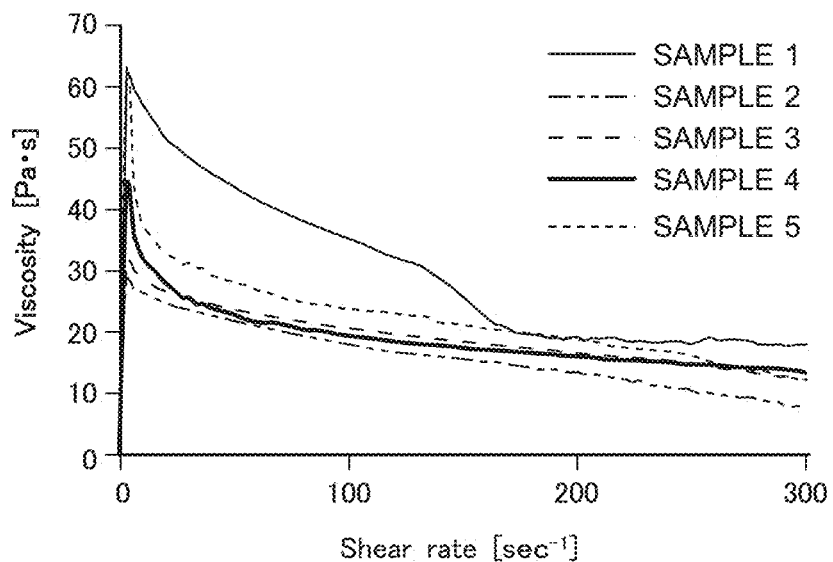
FIG. 4 is a graph showing a relation between shear rate and dynamic viscosity in Samples 1 to 5 of the polyvinyl alcohol solution according to Example 2 of the present invention.

FIG. 4 is a graph showing a relation between the shear rate and the dynamic viscosity of Samples 1 to 5 of the polyvinyl alcohol solution according to Example 2 of the present invention. The horizontal axis of the graph in FIG. 4 shows the shear rate and the unit is per second ($sec^{-1}$). The longitudinal axis of the graph in FIG. 4 shows the dynamic viscosity and the unit is Pascal seconds (Pa·s).

In the graph of FIG. 4, the relation between the shear rate and the dynamic viscosity of Sample 1 is represented by the thin solid line. Further, the relation between the shear rate and the dynamic viscosity of Sample 2 is represented by the dashed-two dotted line. Further, the relation between the shear rate and the dynamic viscosity of Sample 3 is represented by the large dashed line. Further, the relation between the shear rate and the dynamic viscosity of Sample 4 is represented by the bold solid line. Further, the relation between the shear rate and the dynamic viscosity of Sample 5 is represented by the small dashed line.

As shown in FIG. 4, the peak of the dynamic viscosity in the case of using 15 weight percent of the polyvinyl alcohol solution was 43.8 (Pa·s) in Sample 4 containing 0.2 weight percent of the xanthan gum, and 61.9 (Pa·s) in Sample 5 containing 0.5 weight percent of the xanthan gum. Meanwhile, the peak of the dynamic viscosity of Sample 1 that is 17 weight percent of the polyvinyl alcohol solution was 62.1 (Pa·s), resulting in a value approximate to 61.9 (Pa·s) that is the maximum value of the viscosity of 15 weight percent of the polyvinyl alcohol solution in a static state.

This peak of the dynamic viscosity is the dynamic viscosity of the polyvinyl alcohol solution at a shear rate of 3 ($sec^{-1}$), and thus can be said to represent the viscosity of the polyvinyl alcohol solution in a static state. Here, although the viscosity of 15 weight percent of the polyvinyl alcohol solution in a static state is at most 61.9 (Pa·s), errors of at least ±10% are considered to occur from, for example, errors among products such as the content of salts in the xanthan gum and measurement errors such as a measurement apparatus. Therefore, the viscosity of 15 weight percent of the polyvinyl alcohol solution in a static state is considered to be at most 68.1 (Pa·s).

Figure 5:
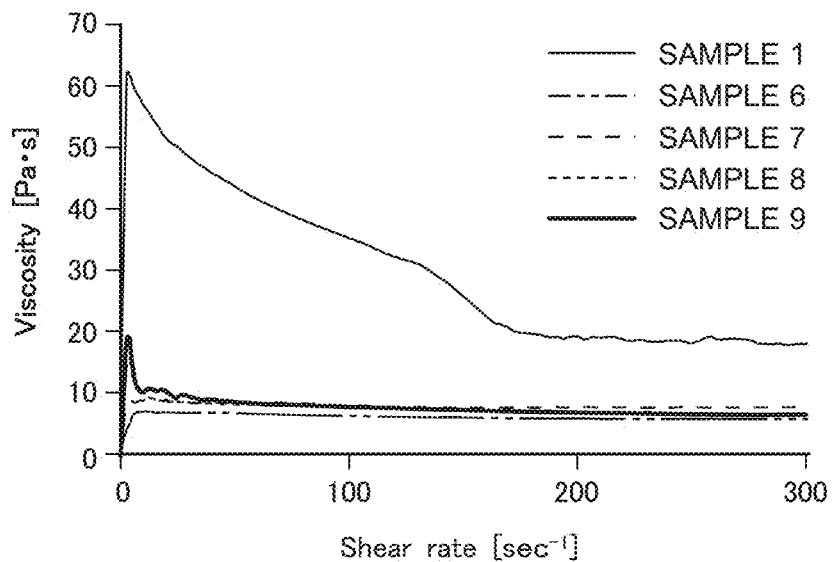
FIG. 5 is a graph showing a relation between shear rate and dynamic viscosity in Samples 6 to 9 of the polyvinyl alcohol solution according to Example 2 of the present invention.

Therefore, it was demonstrated from the results of FIG. 5 that, in 15 weight percent of the polyvinyl alcohol solution, the desired viscosity can be obtained in the hydrogel composition by adding more than 0 weight percent and 0.5 weight percent or less pseudoplastic compound. Also in the polyvinyl alcohol solution, it was demonstrated that a significant effect of decreasing shear rate-dependent viscosity can be observed at a shear rate of 0.01 to 300, in the case of adding the pseudoplastic compound. Further, in the polyvinyl alcohol solution to which the pseudoplastic compound was added, it was demonstrated that the dynamic viscosity at a shear rate of 0.01 to 300 is greater than 0 (Pa·s) and 68.1 (Pa·s) or less.

Particularly when the shear rate is 6 ($sec^{-1}$) or more, it was shown that the dynamic viscosity of 15 weight percent of the polyvinyl alcohol solution becomes significantly lower than the dynamic viscosity of 17 weight percent of the polyvinyl alcohol solution. Particularly, in the case of 15 weight percent of the polyvinyl alcohol solution containing 0.1 to 0.2 weight percent of the xanthan gum, the dynamic viscosity at a shear rate of 6 to 170 $sec^{-1}$ was 16.6 to 40.8 (Pa·s). Further, the difference between the dynamic viscosity of Sample 1 and the dynamic viscosity of Samples 2 to 5 at a shear rate of 12 ($sec^{-1}$) was at least 19.3 (Pa·s). Meanwhile, when the shear rate exceeds 170 ($sec^{-1}$), the difference between the dynamic viscosity of Sample 1 and the dynamic viscosity of Samples 2 to 5 became about 0.2 to 6.0 (Pa·s), and the difference was almost constant.

From the results described above, it was demonstrated that, in the present invention, 15 weight percent of the polyvinyl alcohol solution containing the pseudoplastic compound is particularly effective for discharging it into a mold of the tissue model at a shear rate of 6 to 170 $sec^{-1}$. This is because, at a shear rate of 6 to 170 $sec^{-1}$, the dynamic viscosity of 15 weight percent of the polyvinyl alcohol solution containing xanthan gum is lower than the dynamic viscosity of 17 weight percent of the polyvinyl alcohol solution containing no xanthan gum. Thus, at a shear rate of 6 to 170 $sec^{-1}$, 15 weight percent of the polyvinyl alcohol solution containing xanthan gum can be discharged with smaller energy as compared with 17 weight percent of the polyvinyl alcohol solution. Therefore, it was demonstrated that by using the polyvinyl alcohol solution containing the pseudoplastic compound, cost for manufacturing a tissue model can be reduced.

Further, the present invention can reduce the dynamic viscosity of the polyvinyl alcohol solution, and thus the clogging of the nozzle part or the needle part in apparatuses such as dispensers can be avoided. Therefore, cost and time for the maintenance of apparatuses such as dispensers can be reduced and cost and time for manufacturing a tissue model can be reduced.

FIG. 5 is a graph showing a relation between the shear rate and the dynamic viscosity of Samples 1 and 6 to 9 of the polyvinyl alcohol solution according to Example 2 of the present invention. That is, the horizontal axis of the graph in FIG. 5 shows the shear rate and the unit is per second ($sec^{-1}$). The longitudinal axis of the graph in FIG. 5 shows the dynamic viscosity and the unit is Pascal seconds (Pa·s).

In the graph of FIG. 5, the relation between the shear rate and the dynamic viscosity of Sample 1 is represented by the thin solid line. Further, the relation between the shear rate and the dynamic viscosity of Sample 6 is represented by the dashed-two dotted line. Further, the relation between the shear rate and the dynamic viscosity of Sample 7 is represented by the large dashed line. Further, the relation between the shear rate and the dynamic viscosity of Sample 8 is represented by the small dashed line. Further, the relation between the shear rate and the dynamic viscosity of Sample 9 is represented by the bold solid line.

As shown in FIG. 5, the peak of the dynamic viscosity in the case of using 12 weight percent of the polyvinyl alcohol solution was 18.7 (Pa·s) in Sample 9, resulting in the maximum value of the peak of the dynamic viscosity in Samples 6 to 9 that are 12 weight percent of the polyvinyl alcohol solution. Meanwhile, as described above, the peak of the dynamic viscosity of Sample 1 that is 17 weight percent of the polyvinyl alcohol solution was 62.1 (Pa·s).

This peak of the dynamic viscosity is the dynamic viscosity of the polyvinyl alcohol solution at a shear rate of 3 ($sec^{-1}$), and thus can be said to represent the viscosity of the polyvinyl alcohol solution in a static state. The viscosity of 12 weight percent of the polyvinyl alcohol solution in a static state was at most 18.7 (Pa·s), resulting in the viscosity much lower than 62.1 (Pa·s) that is the viscosity of 17 weight percent of the polyvinyl alcohol solution in a static state. These results are caused because the polyvinyl alcohol-dependent viscosity of 12 weight percent of the polyvinyl alcohol solution is lower than the polyvinyl alcohol-dependent viscosity of 15 weight percent of the polyvinyl alcohol solution. Therefore, it was demonstrated from the results of the viscosity in a static state in FIG. 5 that, if the concentration of the xanthan gum is increased in 12 weight percent of the polyvinyl alcohol solution, the viscosity in a static state equivalent to that of 17 weight percent of the polyvinyl alcohol solution cannot be obtained. Further, in the hydrogel composition obtained by gelation of the polyvinyl alcohol solution, the desired viscosity also cannot be obtained. From the above description, it was shown that, in 12 weight percent of the polyvinyl alcohol solution, if the pseudoplastic compound is added, a significant effect of decreasing shear rate-dependent viscosity cannot be observed due to the low polyvinyl alcohol-dependent viscosity.

As described above, in the case of manufacturing a soft tissue model such as a vascularized tissue, 5 to 20 weight percent of the polyvinyl alcohol solution is used. A significant effect of decreasing shear rate-dependent viscosity was not observed in 12 weight percent of the polyvinyl alcohol solution, a significant effect of decreasing shear rate-dependent viscosity was observed in 15 weight percent of the polyvinyl alcohol solution. These results shows that there is an effect of decreasing shear rate-dependent viscosity in 15 weight percent or more of the polyvinyl alcohol solution. Further, a significant effect of decreasing shear rate-dependent viscosity was not observed in 12 weight percent of the polyvinyl alcohol solution, the peak of the dynamic viscosity was increased to 18.7 (Pa·s) in Sample 9. It is considered from the above results that a significant effect of decreasing shear rate-dependent viscosity cannot be observed in less than 13 weight percent of the polyvinyl alcohol solution and a significant effect of decreasing shear rate-dependent viscosity can be observed in 13 weight percent or more of the polyvinyl alcohol solution. Therefore, it was shown from the measurement results of the dynamic viscosity in Example 2 that, when the content of the polyvinyl alcohol in the hydrogel composition is 13 to 20 weight percent and the content of the pseudoplastic compound in the hydrogel composition is more than 0 weight percent and 0.5 weight percent or less, a significant effect of decreasing shear rate-dependent viscosity can be observed.

Example 3

(Preparation of Sample of Hydrogel Composition)

The polyvinyl alcohol solution produced by the method shown in Example 1 was cooled to 40 degrees C. under a thermoneutral environment. Thereafter, the polyvinyl alcohol solution was injected into a mold, and the mold into which the polyvinyl alcohol solution was injected was cooled for 24 hours under a temperature condition of −30 degrees C., thereby preparing Samples A to M of the hydrogel composition as shown in Table 2 and Table 3. As the mold, a rectangular stainless steel mold having a long side length of 50 mm, a short side length of 8 mm, and a thickness of 1 mm was used. Incidentally, the indication "N/A" in Table 2 means that the hydrogel composition contains no xanthan gum.

TABLE 2

|  | SAMPLE A | SAMPLE B | SAMPLE C | SAMPLE D | SAMPLE E | SAMPLE F | SAMPLE G |
| --- | --- | --- | --- | --- | --- | --- | --- |
| NUMBER OF SAMPLES(n) | 3 | 3 | 6 | 11 | 7 | 7 | 7 |
| PVA CONCENTRATION(wt %) | 17 |  |  |  | 15 |  |  |
| XG CONCENTRATION(wt %) | N/A | N/A | 0.1 | 0.15 | 0.2 | 0.25 | 0.3 |

TABLE 3

|  | SAMPLE H | SAMPLE I | SAMPLE J | SAMPLE K | SAMPLE L | SAMPLE M |
| --- | --- | --- | --- | --- | --- | --- |
| NUMBER OF SAMPLES(n) | 10 | 7 | 4 | 4 | 4 | 4 |
| PVA CONCENTRATION(wt %) |  |  | 15 |  |  |  |
| XG CONCENTRATION(wt %) | 0.4 | 0.5 | 0.6 | 0.7 | 0.8 | 0.9 |

Sample A in Table 2 is the hydrogel composition containing 17 weight percent of the polyvinyl alcohol containing no xanthan gum and one example of the hydrogel composition conventionally used to manufacture a soft tissue model such as a vascularized tissue.

Further, as Comparative Examples, the polyvinyl alcohol solution containing sodium alginate as the conventional thickener instead of the xanthan gum was produced and Comparative Samples AA, BB, and CC of the hydrogel composition shown in Table 4 were prepared under the same conditions as the preparation conditions of Samples A to M described above. The number of samples was 1 for Samples AA, BB, and CC. Further, as the sodium alginate, a commercial product of special grade, "cica first grade" manufactured by Kanto Chemical Industry Co., Ltd. was used. Incidentally, in the following descriptions, sodium alginate is abbreviated as "AlgNa".

TABLE 4

|  | COMPPARATIVE SAMPLE AA | COMPPARATIVE SAMPLE BB | COMPPARATIVE SAMPLE CC |
| --- | --- | --- | --- |
| PVA CONCENTRATION(wt %) |  | 15 |  |
| AlgNa CONCENTRATION(wt %) | 0.1 | 0.2 | 0.3 |

[Example 4] (Measurement of Tensile Stress of Hydrogel Composition)

The tensile stress of Samples A to M and Comparative Samples AA, BB, and CC of the hydrogel composition prepared in Example 3 was measured. In measurement of the tensile stress of the sample of the hydrogel composition, a small table-top testing machine, Model No. EZ-S, manufactured by SHIMADZU CORPORATION was used as a uniaxial tensile testing machine. Both ends at the long side of the sample of the hydrogel composition were held with grips of the uniaxial tensile testing machine to fix the sample of the hydrogel composition such that an initial distance between the grips would be 40 mm.

Next, the fixed sample of the hydrogel composition was pulled in both directions at a speed of 20 mm/min until the strain of the sample of the hydrogel composition would be 100%, and then the strain of the sample of the hydrogel composition was restored to 0%. That is, the fixed sample of the hydrogel composition was pulled in both directions until the distance between the grips would be two times the initial distance, and then the distance between the grips was restored to the initial distance. In Example 2, the fixed sample of the hydrogel composition was pulled until the distance therebetween would be 80 mm, and then the distance therebetween was restored to 40 mm.

In Example 2, taking hysteresis of the sample of the hydrogel composition into consideration, the above-described operation cycle was repeated three times, and the strain of the sample of the hydrogel composition and the tensile stress of the sample of the hydrogel composition in the third cycle were measured for every 0.05 seconds.

Further, the Young's modulus that is an index for an elasticity in tension of the sample of the hydrogel composition was calculated from the results of the tensile test. In the sample of the hydrogel composition, when a value of strain is larger than 0.6, non-linearity between the strain and the tensile stress becomes significant. Therefore, regarding each sample of the hydrogel composition, the Young's modulus was calculated as a Young's modulus at a strain of 0.5 in which linearity of the Young's modulus is maintained, that is, at a strain of 50%. The Young's modulus of Samples A to M was calculated from average value±standard deviation of each of Samples A to M.

Figure 6:
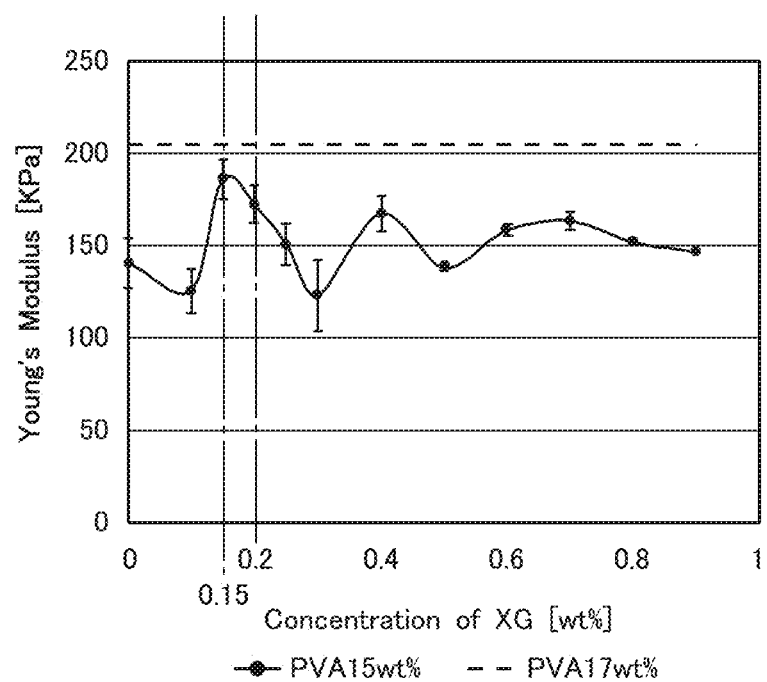
FIG. 6 is a graph showing the relation between a concentration of the xanthan gum and a Young's modulus at strain of 0.5 in samples of the hydrogel composition containing xanthan gum according to Example 4 of the present invention.

FIG. 6 is a graph showing the relation between the concentration of the xanthan gum and the Young's modulus with respect to the strain of 0.5 in the sample of the hydrogel composition containing the xanthan gum according to Example 4 of the present invention. The horizontal axis of the graph in FIG. 6 shows the concentration of the xanthan gum and the unit is weight percent (wt %). The longitudinal axis in FIG. 6 shows the Young's modulus with respect to the strain of 0.5 and the unit is kilopascals (kPa). The dashed line in FIG. 6 represents an average value of the Young's modulus with respect to the strain of 0.5 of Sample A. Further, the solid line in FIG. 6 represents, in the hydrogel composition containing 15 weight percent of the polyvinyl alcohol, the change of the Young's modulus with respect to the strain of 0.5 when the concentration of the xanthan gum was changed, and each plot point represents the average value of the Young's modulus with respect to the strain of 0.5 of Samples B to M from the left. Further, the standard deviation of the Young's modulus with respect to the strain of 0.5 of each of Samples B to M was illustrated with error bars extending vertically from each plot points. Incidentally, the Young's modulus with respect to the strain of 0.5 of Sample B containing no xanthan gum and containing 15 weight percent of the polyvinyl alcohol was 140.4±3.8 (kPa) and less than 150 (kPa).

As shown in FIG. 6, in Samples C to M containing xanthan gum, the Young's modulus comparable to or higher than that of Sample B containing no xanthan gum was acquired. Particularly, as shown with the dashed-dotted line in FIG. 6, in the case of containing 0.15 to 0.20 weight percent of the xanthan gum, the Young's modulus with respect to the strain of 0.5 of the hydrogel composition containing 15 weight percent of the polyvinyl alcohol was closest to the Young's modulus with respect to the strain of 0.5 of the hydrogel composition containing 17 weight percent of the polyvinyl alcohol. Specifically, the Young's modulus with respect to the strain of 0.5 of the hydrogel composition containing 17 weight percent of the polyvinyl alcohol (Sample A) was 204.8±13.7 (kPa). In contrast, the Young's modulus with respect to the strain of 0.5 of Sample D containing 0.15 weight percent of the xanthan gum was 186.1±12.1 (kPa). Further, the Young's modulus with respect to the strain of 0.5 in Sample E containing 0.2 weight percent of the xanthan gum was 172.1±10.9 (kPa).

Further, as shown in FIG. 6, the Young's modulus with respect to the strain of 0.5 with the content of the xanthan gum being in a range of 0.12 to 0.15 weight percent was decreased as compared with the case in which the content of the xanthan gum is 0.15 to 0.20 weight percent, but exceeded 150 (kPa). Further, the Young's modulus with respect to the strain of 0.5 with the content of the xanthan gum being in a range of 0.20 to 0.25 weight percent was decreased as compared with the case in which the content of the xanthan gum is 0.15 to 0.20 weight percent, but exceeded 150 (kPa). Further, also in a range of 0.34 to 0.46 weight percent including the hydrogel composition containing 0.40 weight percent of the xanthan gum (Sample H) in the range, the Young's modulus with respect to the strain of 0.5 exceeded 150 (kPa). Further, also in a range of 0.55 to 0.82 weight percent including the hydrogel compositions containing 0.60 weight percent and 0.70 weight percent of the xanthan gum (Sample K) in the range, the Young's modulus with respect to the strain of 0.5 exceeded 150 (kPa).

In contrast, The Young's modulus with respect to the strain of 0.5 of Comparative Sample AA was 98 (kPa). The Young's modulus with respect to the strain of 0.5 of Comparative Sample BB was $1.1 \times 10^2$ (kPa). The Young's modulus with respect to the strain of 0.5 of Comparative Sample CC was $1.3 \times 10^2$ (kPa). That is, in the hydrogel composition using the polyvinyl alcohol solution containing sodium alginate, the Young's modulus with respect to the strain of 0.5 was at most $1.3 \times 10^2$ (kPa) and less than 150 (kPa).

From the results described above, it was shown that, in the hydrogel composition using the polyvinyl alcohol solution containing the pseudoplastic compound, the Young's modulus of the hydrogel composition, that is, the hardness of the hydrogel composition can be effectively increased.

It is shown Non-Patent Literature 1 that, as the upper limit of the dynamic viscoelasticity G' of the hydrogel composition, the dynamic viscoelasticity G' is $2.0 \times 10^3$ (Pa), that is, 200 (kPa) in the hydrogel composition using 18 weight percent of the polyvinyl alcohol solution. Here, the dynamic viscoelasticity G' of Non-Patent Literature 1 was measured at a small frequency of 1 (Hz), and thus used as a parameter corresponding to the shear modulus that represents the static viscoelasticity of the hydrogel composition. Further, when the hydrogel composition is used as a material for a soft tissue model such as a vascularized tissue, the Poisson ratio of the hydrogel composition is 0.5. Further, when the Poisson ratio of the hydrogel composition is 0.5, the dynamic viscoelasticity G' of Non-Patent Literature 1 is the Young's modulus with respect to the strain of 0.5, that is, ⅓ of the tensile modulus.

Therefore, when a soft tissue model such as a vascularized tissue is produced by using the hydrogel composition of the present Examples, the hydrogel composition can be configured such that the Young's modulus with respect to the strain of 0.5 becomes at least $6.0 \times 10^2$ (kPa) or less. Further, in the dynamic viscoelasticity G' of the hydrogel composition, errors of at least ±10% are considered to occur from errors among products such as the content of salts in the xanthan gum and measurement errors such as a measurement apparatus. Therefore, in the case of taking errors of ±10% into consideration, the hydrogel composition can be configured such that the Young's modulus with respect to the strain of 0.5 becomes at least $6.6 \times 10^2$ (kPa) or less. Furthermore, as described above, when a soft tissue model such as a vascularized tissue is produced by using the hydrogel composition of the present Examples, a hydrogel composition using at most 20 weight percent of the polyvinyl alcohol solution is produced, and thus the hydrogel composition can be configured such that the Young's modulus with respect to the strain of 0.5 becomes at least $7.0 \times 10^2$ (kPa) or less.

Meanwhile, according to Non-Patent Literature 1, it was shown that the lower limit of the dynamic viscoelasticity G' of the hydrogel composition is $5 \times 10^3$ (Pa). Therefore, when a soft tissue model such as a vascularized tissue is produced by using the hydrogel composition of the present Examples, the hydrogel composition can be configured such that the Young's modulus with respect to the strain of 0.5 becomes at least 15.0 (kPa) or more. Further, in the case of taking errors of ±10% into consideration, the hydrogel composition can be configured such that the Young's modulus with respect to the strain of 0.5 becomes at least 13.5 (kPa) or more.

From the consideration described above, the hydrogel composition in which the Young's modulus with respect to the strain of 0.5 is 13.5 to 700 (kPa) can be preferably used as a material for a tissue model.

Further, in the hydrogel composition in which the content of the xanthan gum is 0.12 to 0.25, 0.34 to 0.46, or 0.55 to 0.82 weight percent, the Young's modulus with respect to the strain of 0.5 was increased as compared with the case of containing no xanthan gum. Particularly, in the hydrogel composition containing the polyvinyl alcohol of 0.15 to 0.20 weight percent of the xanthan gum, the Young's modulus with respect to the strain of 0.5 was $1.6 \times 10^2$ to $2.0 \times 10^2$ (kPa). Therefore, the hydrogel composition in which the content of the xanthan gum is in the above range, or the hydrogel composition in which the Young's modulus with respect to the strain of 0.5 is in the above range can be preferably used as a material for a a tissue model that can increase the hardness. Further, the hydrogel composition in which the Young's modulus with respect to the strain of 0.5 is $1.6 \times 10^2$ to $2.0 \times 10^2$ (kPa) can be further preferably used as a material for a tissue model.

Particularly, the Young's modulus with respect to the strain of 0.5 of the hydrogel composition containing 15 weight percent of the polyvinyl alcohol and 0.15 to 0.20 weight percent of the xanthan gum is approximate to the hydrogel composition containing no xanthan gum and containing 17 weight percent of the polyvinyl alcohol. As shown in Example 2, the solution of 15 weight percent of the polyvinyl alcohol containing xanthan gum has lower dynamic viscosity than the solution of 17 weight percent of the polyvinyl alcohol containing no xanthan gum. Therefore, in the present invention, it is possible to provide a tissue model by which cost and time for manufacturing can be reduced by manufacturing a tissue model with the hydrogel composition containing 15 weight percent of the polyvinyl alcohol and 0.15 to 0.20 weight percent of the xanthan gum.

REFERENCE SIGNS LIST

1 Polyvinyl alcohol
2 Basic skeleton
2a First hydrocarbon skeleton part
2b Second hydrocarbon skeleton part
3 Functional group
4 Acetate group
5 Hydroxyl group
10 Hydrogel composition
12 Polymer chain
12a First polymer chain
12b Second polymer chain
14 Crosslink region
16 Network portion
18 Solvent

The invention claimed is:

1. A hydrogel composition for a tissue model, the hydrogel composition comprising a polyvinyl alcohol and a pseudoplastic compound,
   wherein a Young's modulus at a strain of 0.5 of the hydrogel composition is 160 to 700 kPa,
   wherein a content of the polyvinyl alcohol in the hydrogel composition is 13 to 20 weight percent and a content of the pseudoplastic compound in the hydrogel composition is more than 0 weight percent and 0.5 weight percent or less; and
   wherein a dynamic viscosity of a solution including the polyvinyl alcohol and the pseudoplastic compound prepared before the production of the hydrogel composition is 16.6 Pa·s to 40.8 Pa·s at a shear rate of 6 to 170 $\sec^{-1}$.

2. The hydrogel composition according to claim 1, wherein the pseudoplastic compound is selected from the group consisting of xanthan gum, ultraxanthan gum, guar gum, wel an gum, deutan gum, tamarind seed gum, locust bean gum, rhamzan gum, carrageenan, pullulan, curdlan, hydroxyethylcellulose, hydroxypropylethylcellulose, methylcellulose, acrylics, and salts and derivatives thereof, and combinations thereof.

3. The hydrogel composition according to claim 1, wherein an average degree of saponification of the polyvinyl alcohol is 85 mol % or more, and an average degree of polymerization of the polyvinyl alcohol is 1000 to 2000.

4. A tissue model comprising the hydrogel composition according to claim 1.

5. The tissue model according to claim 4, wherein the tissue is a body soft tissue.

6. The tissue model according to claim 5, wherein the body soft tissue is a vascularized tissue.

7. The hydrogel composition according to claim 1, wherein a Young's modulus at a strain of 0.5 of the hydrogel composition is 160 to 660 kPa.

8. The hydrogel composition according to claim 7, wherein a Young's modulus at a strain of 0.5 of the hydrogel composition is 160 to 600 kPa.

9. The hydrogel composition according to claim 8, wherein a Young's modulus at a strain of 0.5 of the hydrogel composition is 160 to 200 kPa.

10. The hydrogel composition according to claim 1, wherein a content of the polyvinyl alcohol in the hydrogel composition is 15 weight percent and a content of the pseudoplastic compound in the hydrogel composition is 0.15 to 0.20 weight percent.

11. The hydrogel composition according to claim 1, wherein the hydrogel composition contains a crosslink region.

12. A manufacturing method for a tissue model, the method comprising:
- a step of preparing a solution including a polyvinyl alcohol and a pseudoplastic compound, a content of the polyvinyl alcohol in a hydrogel composition being 13 to 20 weight percent, a content of the pseudoplastic compound in the hydrogel composition being more than 0 weight percent and 0.5 weight percent or less; wherein a Young's modulus at a strain of 0.5 of the hydrogel composition is 160 to 700 kPa;
- a step of measuring the shear rate and/or dynamic viscosity of the solution including the polyvinyl alcohol and the pseudoplastic compound prepared before the production of the hydrogel composition; wherein the dynamic viscosity is 16.6 Pa·s to 40.8 Pa·s; and
- a step of discharging the solution into a mold of the tissue model from nozzle part or needle part at a shear rate of 6 to 300 $\sec^{-1}$.

13. The manufacturing method for a tissue model according to claim 12, wherein the shear rate of the solution is 6 to 170 $\sec^{-1}$.

* * * * *